United States Patent [19]
Dahlgren

[11] Patent Number: 5,078,465
[45] Date of Patent: Jan. 7, 1992

[54] FUSED FIBER OPTIC COUPLER

[75] Inventor: Robert P. Dahlgren, Somerville, Mass.

[73] Assignee: The Charles Stark Draper Laboratory, Inc., Cambridge, Mass.

[21] Appl. No.: 460,637

[22] Filed: Jan. 3, 1990

[51] Int. Cl.$^5$ ................................................ G02B 6/26
[52] U.S. Cl. ........................................ 385/50; 385/51; 385/52
[58] Field of Search ............... 350/96.5, 96.2, 96.21, 350/320

[56] References Cited

U.S. PATENT DOCUMENTS

| | | | |
|---|---|---|---|
| Re. 33,296 | 8/1990 | Stowe et al. | 350/320 |
| 4,593,968 | 6/1986 | Giallorenzi | 350/96.45 |
| 4,634,858 | 1/1987 | Gerdt et al. | 73/705 X |
| 4,669,820 | 6/1987 | Ten Berge | 350/96.21 |
| 4,688,882 | 8/1987 | Failes | 350/96.15 |
| 4,697,876 | 10/1987 | Dyott | 350/96.29 |
| 4,705,352 | 11/1987 | Margolin et al. | 350/96.2 |

FOREIGN PATENT DOCUMENTS

| | | | |
|---|---|---|---|
| 54-10752 | 1/1979 | Japan | 350/96.21 |
| 55-76313 | 6/1980 | Japan | 350/96.21 |
| 55-96912 | 7/1980 | Japan | 350/96.21 |
| 61-63803 | 4/1986 | Japan | 350/96.21 |
| 61-112106 | 5/1986 | Japan | 350/96.21 |

OTHER PUBLICATIONS

"Protection of Optical Fiber Arc Fusion Splices"-S. Stueflotten,-Journal of Optical Communications, 3(1982) 1, pp. 19-25.

Fiber-Optic Coupler Sensors: "Biomedical Applications", in Sensors, Sep. 1988, pp. 20.23.

Primary Examiner—John D. Lee
Assistant Examiner—John Ngo
Attorney, Agent, or Firm—Lahive & Cockfield

[57] ABSTRACT

A fiber is mounted with a bare portion extending between two blocks. Four blocks securing a pair of fibers in this manner are mutually aligned by one or more external sleeves, and the fibers are fused and drawn to form a coupler of defined coupling ratio. One sleeve then slides over all four blocks and is bonded to constitute a rigid housing surrounding the fusion region. A preferred coupling block is a grooved D-rod, and different geometries are shown to provide effective PZ and PM fusion couplings, with fiber stress axes aligned with respect to a flat surface of the rod. Portions of the rod provide fiber support and alignment during fusion, and break away from the assembled coupler when complete.

21 Claims, 9 Drawing Sheets

FUSED FIBER OPTIC COUPLER

BACKGROUND OF THE INVENTION

The present invention relates to methods and apparatus for forming a fused optical coupling between fibers Such coupling is generally accomplished by removing the jacket from a portion of each of two fibers, mechanically contacting, twisting, or otherwise preloading the bare cladding of the fibers against each other, and then applying heat to fuse the fibers while they are simultaneously drawn and elongated. The drawing of tapers out of the fibers brings the cores into sufficient proximity to couple the evanescent wave from one core to the other.

While such a coupler may be fabricated quickly and does not require precisely worked optical mounting components, the process does require attention to accurately align and to preload the fibers in contact, and the fusion/drawing process itself can seriously degrade fibers, particularly polarizing or polarization-maintaining fibers which rely on internal stresses to propagate separate polarization modes in the core. In particular, even assuming that the internal stress structure of a fiber remains undisturbed, for such fibers, the crosstalk between polarization modes (in Decibels) has been found to vary with $10 \log \tan^2 \Delta\theta$, where $\Delta\theta$ is the rotational misalignment in radians between principal axes of two fibers. Alignment to within a fraction of a degree is therefore necessary to prevent cross-coupling between one polarization eigenmode and the other. These internally asymmetric fibers have a nominally circular outer profile, which further complicates the tasks of maintaining them in rotational alignment with respect to each other, achieving a smooth taper of low slope, preserving geometrical symmetry and minimizing physical perturbations of the fiber.

SUMMARY OF INVENTION

It is an object of the invention to provide a fiber fusion process and an improved fused fiber coupler made according to the process. The coupler has the advantages of low cost, stability of splitting ratio, better fiber axis alignment with attendant low polarization cross-coupling, ruggedness, and environmental resistance.

In a method of fabricating a fused fiber coupler according to the invention, the jacket is stripped from a pair of fibers by mechanical or chemical means, and the fibers are each mounted in a grooved rod or block having a precisely formed reference surface, oriented such that each reference surface is aligned with respect to a given one of the fiber's internal principal axes. Thus, each rod determines an axial positioning and rotational alignment of its fiber and forms an external reference surface. Pairs of rods are then opposed and are manipulated to precisely contact the fibers and to draw a fused coupler. Preferably, the rods are D-rods, i.e., rods having a D-shaped cross-section, and the fiber is located in a groove in each rod's flat surface. The rods are placed flat-to-flat to position the fibers in contact, and once the fibers are fused they are drawn by moving the rods longitudinally. After drawing, a tube is placed about the contacting rods to permanently secure them together and enclose the fixed juncture. Preferably, each rod is a long body with its bared fiber secured to a small segment at one end. After fusion, the major portion of the rod snaps off, so that only the small segments remain as parts of the body of the completed coupler. The rods and tube may be formed of silica or may be precision molded of Plastic or glass.

BRIEF DESCRIPTION OF DRAWINGS

These and other features of the invention will be understood from the following description of the practice of the invention and representative embodiment thereof, wherein.

DETAILED DESCRIPTION OF INVENTION

Figure 1A:
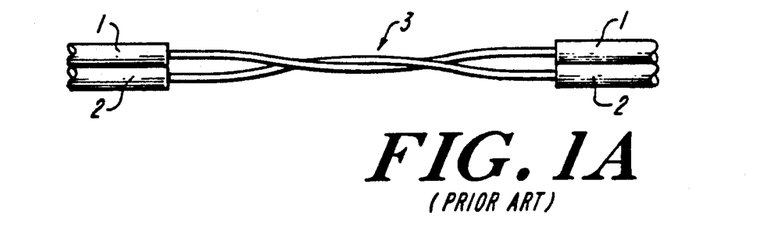
FIGS. 1a–1c illustrate various known fiber preloading approaches.
Figure 1B:
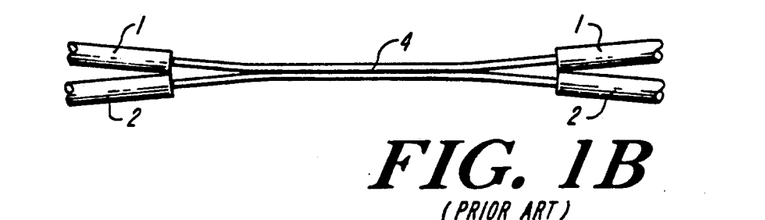
Figure 1C:
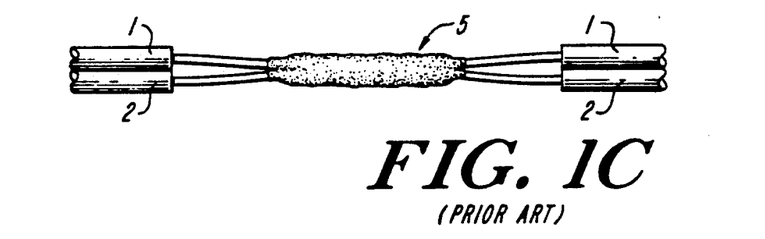

FIGS. 1a–1c show known methods of preloading a pair of optical fibers into physical contact prior to fusing and drawing the contacted area to form a coupler. The birefringent principal axes of the fiber pair may be determined by elasto-optic Nomarski contrast, or optical diffraction methods as they are positioned in order to assure correct mutual axial alignment, after which the fibers are maintained in contact by one of these methods and the contacted fibers are fused and drawn to a taper.

In FIG. 1a, a pair of fibers 1, 2 are bared and twisted about each other in a region 3 to create a mutual contact region along each fiber. In FIG. 1b, the adjoining jacketed portion of each fiber is held at an angle so that one fiber bends or arcs toward and contacts the other fiber at a contact point 4. In FIG. 1c, the aligned fibers are secured together by "soot" 5, a silica-based particulate deposit which is formed by a modified chemical vapor deposition process. Using any of these contacting approaches, the contacting regions of the fibers are heated to a melting temperature and the opposed ends of the fibers are then pulled in a longitudinal direction by a controlled amount to cause the contacting portions to draw and taper sufficiently that the adjacent fiber cores approach each other and achieve a desired level of optical coupling.

When this technique is used on a polarization-maintaining or a polarizing fiber, the coupling characteristics obtained may vary widely with quite small changes in orientation of the fiber or variations in the pulling conditions. Accordingly, it is desirable to provide a fixture which minimizes twisting or wandering of the contacted fiber portions and assures easy alignment of the two fibers.

Figure 2A:
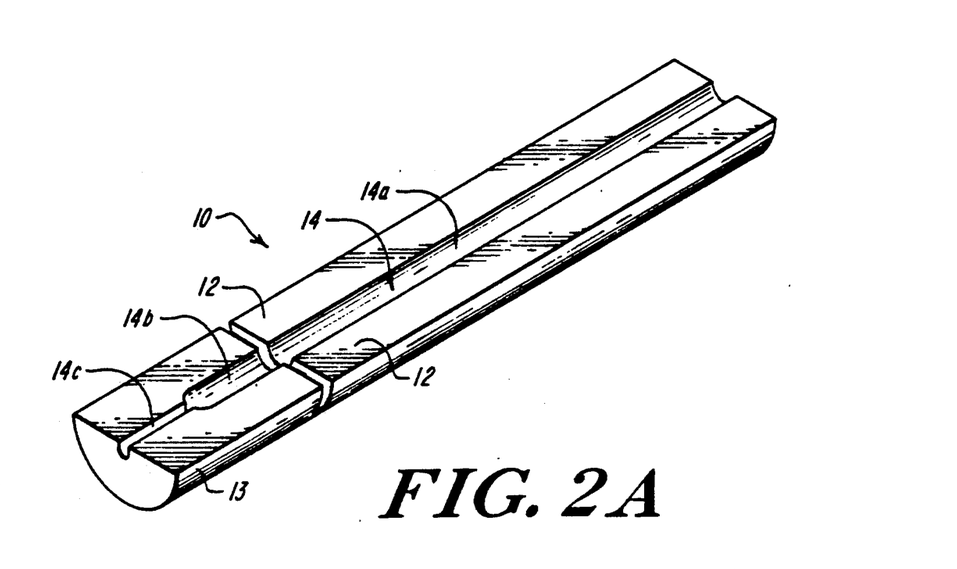
FIGS. 2a–2e show different views of a fiber-holding rod in a preferred embodiment of the present invention.
Figure 2B:
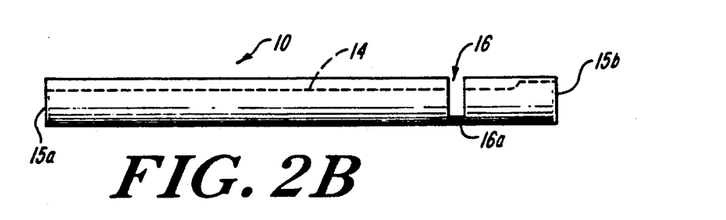

FIG. 2a shows a block or rod 10, from a top perspective view, which aligns and secures a fiber (not shown) for coupling in accordance with the present invention.

The illustrated rod 10 is a substantially hemicylindrical D-rod, with one flat surface 12 and another surface 13 which is a curved surface of uniform curvature. As explained further below, the rod may be slightly more or less than a hemicylinder; surface 12 is, however, if not a diametral surface, at least substantially parallel to the diameter of the cylinder. Extending along the length of rod 10 in surface 12 is a groove 14 having a first substantially uniform portion 14a of a dimension for receiving a jacketed length of fiber passing therealong, and a second portion 14b terminating in a smaller width groove 14c dimensioned to secure the bare cladding of an unjacketed fiber portion. Portions 14a, 14b are cut as a single groove.

As will be explained below, rod 10 is adapted, once a fiber is properly mounted therein, to maintain the propagation axes of the fiber precisely oriented during fusing and to become the body of a completed coupler. The rod itself is preferably formed of a silica which has thermal expansion properties closely matched to those of the fiber, although in different embodiments the rod may be molded of plastic or like material.

Figure 2C:
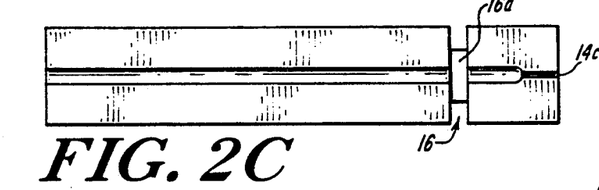
Figure 2D:
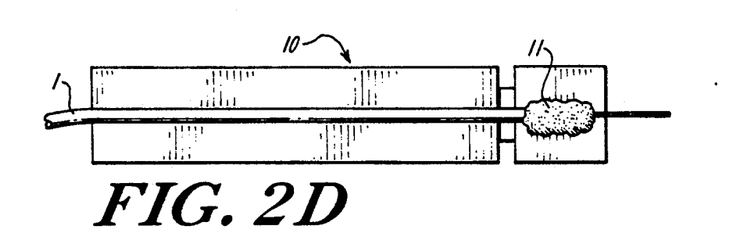
Figure 2E:
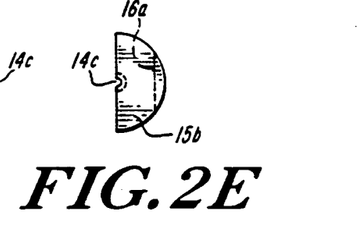

FIGS. 2b-2e illustrate different views of the rod 10 and details thereof. In side view, FIG. 2b, the groove 14 is shown in phantom extending entirely from one end face 15a of rod 10 to the other end face 15b. Also visible is a cross cut or deep groove 16 extending almost entirely from the top to the bottom of the rod. A small remaining portion of the rod 16a interconnects a lesser end of the rod containing grooves 14b, 14c with the major, or longer, portion of the rod containing groove 14a. Relative sizes of the rod, grooves and connecting portion are shown in FIGS. 2c, 2e. Portion 16a is intended as a frangible or break-away connecting link, described further below. In general, the long groove 14a is intended as a support channel which is at a constant depth for holding the fiber jacket, and the short groove 14c is located at a different overall depth, or inclines downwardly, to support the bare fiber in stress-free alignment with respect to the groove 14a and an intended fiber fusion region. FIG. 2d illustrates a fiber 1 mounted in the rod, with cement 11 securing the bare fiber and jacket in grooves 14b, 14c.

FIGS. 3a-3f show steps involved in the fabrication of rod 10, or, more accurately, of a matched pair of rods, starting with silica cylindrical rod stock. A discussion of these particular fabrication steps is intended to indicate the relative dimensions, finish and related properties possessed by such a rod.

Figure 3A:
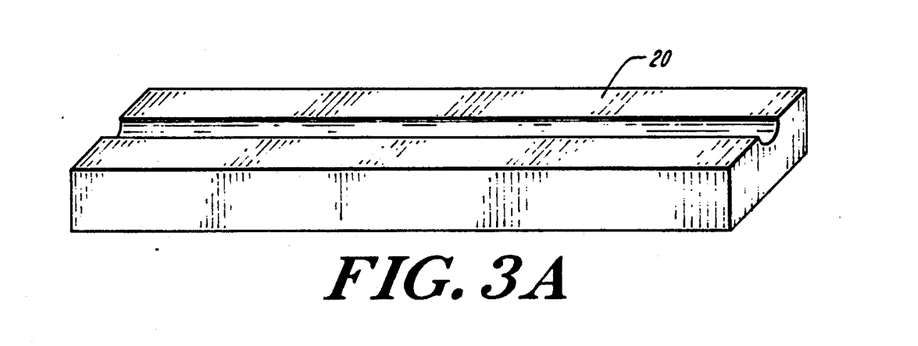
FIGS. 3a–3f show steps of fabricating the rod of FIG. 2.
Figure 3B:
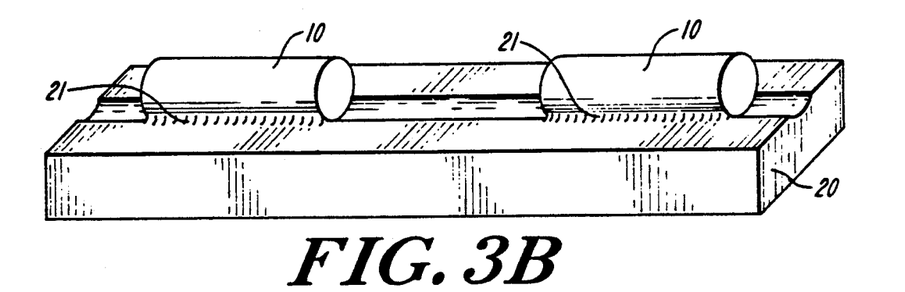
Figure 3C:
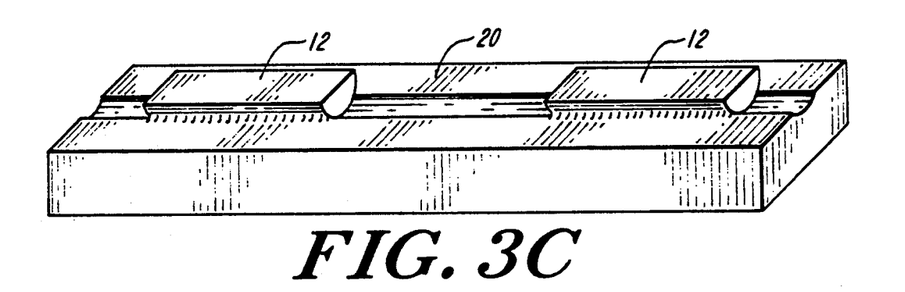
Figure 3D:
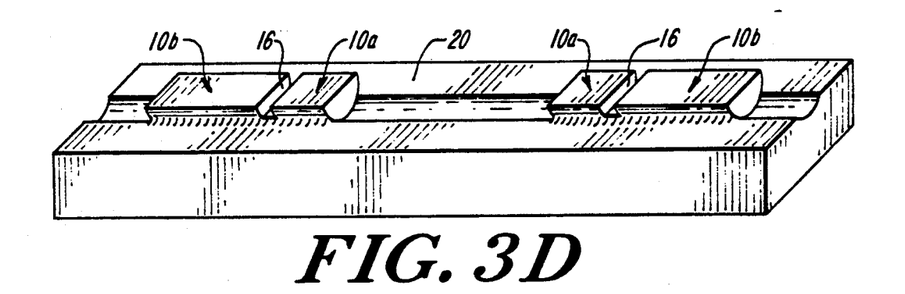

FIG. 3a shows a precision V-groove fixture 20, into which in FIG. 3b a matched pair of glass rods are secured by a mounting wax 21 so as to provide a coaxial pair which are held in alignment for subsequent working. In FIG. 3c both rods are ground flat on a diamond grinder parallel to the base of the V-block fixture to produce the flat surface 12 which is nominally a diametral plane surface. In FIG. 3d a cross-groove 16 is cut substantially through the rod and perpendicular to the cylinder axis of each rod so that each rod has a minor portion 10a, proximate to the other rod, and a distal major portion 10b separated from the minor portion by the deep groove 16.

Figure 3E:
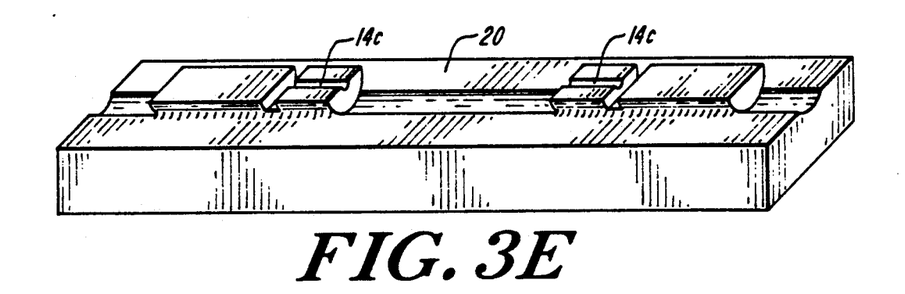
Figure 3F:
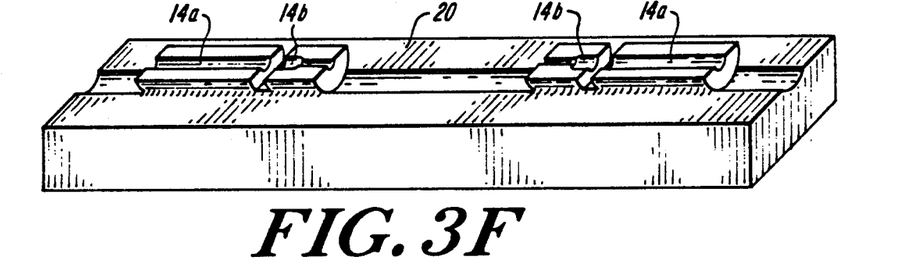

In FIG. 3e the thin groove 14c, barely wider than the diameter of the bare fiber cladding, is cut into the minor portion 10a with a diamond foil saw, and, in FIG. 3f the larger groove 14b, 14a is cut extending from the outer end of minor rod segment 10a along major rod portion 10b. The larger groove is sized to receive a jacketed fiber. Both grooves are centered along the cylinder axis so that a fiber held therein will extend straight along the axial direction. Each groove is deep enough so that the fiber may lie below surface 12 For a fiber of nominal 80 micron cladding diameter and 200 micron jacket diameter, groove 14a, 14b could be 200 microns deep, while the thin portion groove 14c could be somewhat over 80 microns deep, although, as discussed further below, different geometries for groove 14care contemplated to achieve effective and repeatable fiber contact.

The completed alignment rods 10 may then be debonded from the V-block and transferred to a precision fiber alignment fixture for the succeeding steps of attachment to a fiber and fabrication of a coupler. However, an initial embodiment in which the D-rods remain bonded to the V-block will first be described.

Figure 4A:
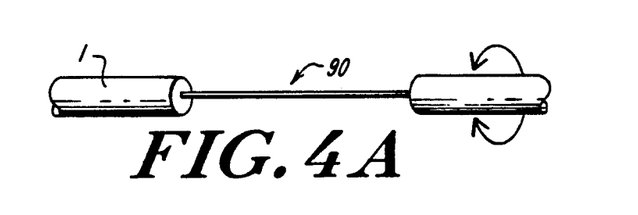
FIGS. 4a–4d show steps of preparing a rod and fiber for coupling.
Figure 4B:
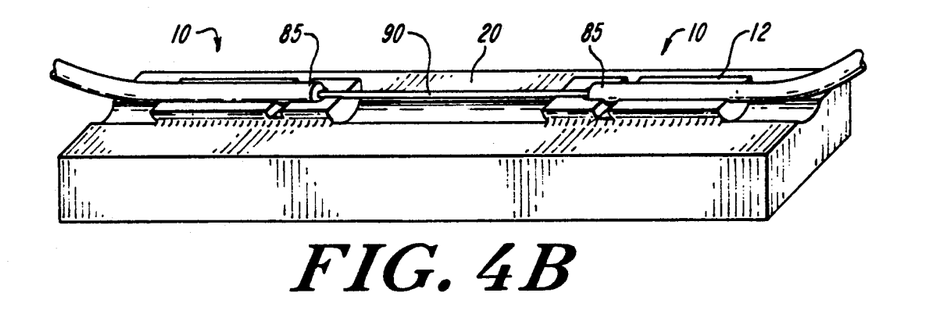
Figure 4C:
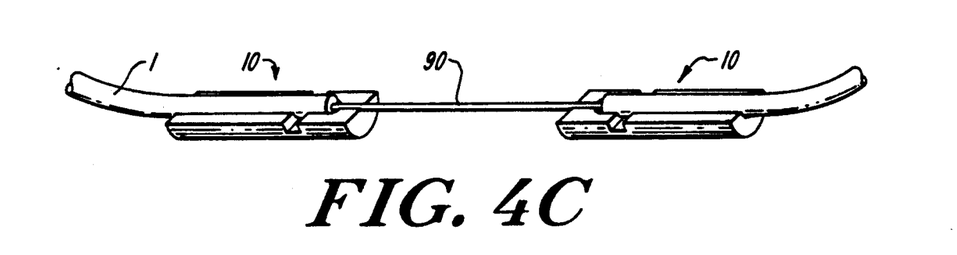

FIGS. 4a-4d illustrate mounting of a fiber 100 in a pair of completed rods 10 and preparation for fusing In FIG. 4a a fiber 1 is stripped of its jacket in a central region 90 of approximately 1-5 centimeters length, the exposed cladding is cleaned, and observations are then made to determine the orientation of the principal axis of the fiber. Then, with the principal axis held parallel to surface 12, the fiber is placed in the grooves 14a, 14b, 14c extending through both rods, with the bare portion 90 located between the rods and precisely positioned by the grooves 14c. The fiber is bonded into the grooves 14c 14b with a drop of cement at position 85 to maintain this fixed alignment with respect to the flat surface 12 of each rod. Care is taken so that the cement does not reach groove 14a. For securing the fiber in this manner, a UV-curable epoxy such as a Norland 61 is a suitable bonding agent. After curing, the epoxy is trimmed or lapped flush with the flat reference surface.

Figure 4D:
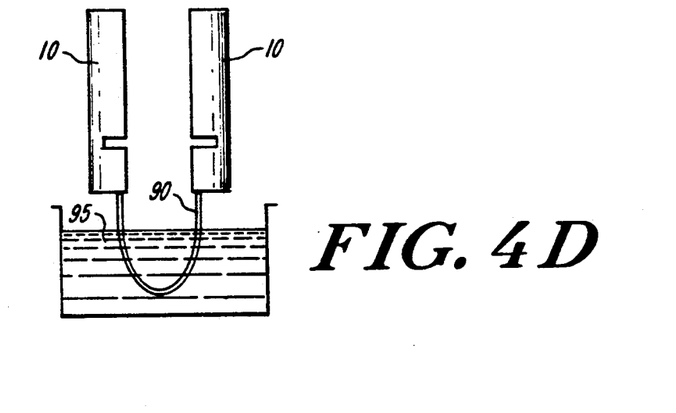

The wax 21 holding the rods 10 on V-fixture 20 is then melted to release both rods, and at FIG. 4d the exposed mounted portion 90 of the fiber is etched in a buffered hydrofluoric acid solution 95 or otherwise prepared for fusing. For the smaller fibers customarily employed in fiber fusion coupling (e.g., about 80 micron diameter) the etching step is not necessary.

The foregoing operations produce a single fiber having a pair of attached D-rods, denoted A and B in FIG. 4d, which precisely position the bare fiber with its principal birefringence axis parallel to the flat surface of each of the D-rods. A batch of fiber coupler components may be prepared in this manner and may be presorted by size for later assembly. Similarly, quartz glass, stainless steel or INVAR tubing having a nominal inner diameter slightly larger than the rod original outer diameter may be sorted by size to provide outer sleeves or tubes to hold pairs of the sized D-rods together. Preferably, the material employed for the sleeves has a thermal coefficient of expansion matched to that of the rods and fibers.

Figure 5A:
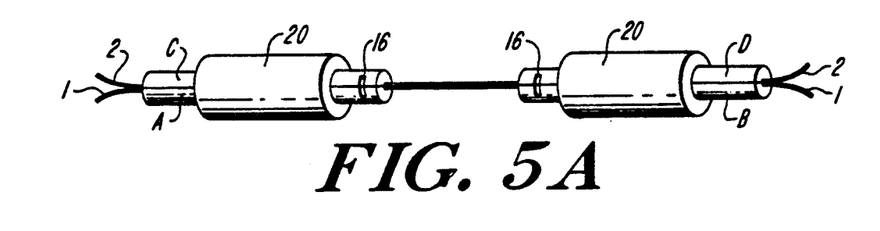
FIGS. 5a–5g show steps of assembling a coupler from rod-and-fiber units prepared for coupling.
Figure 5B:
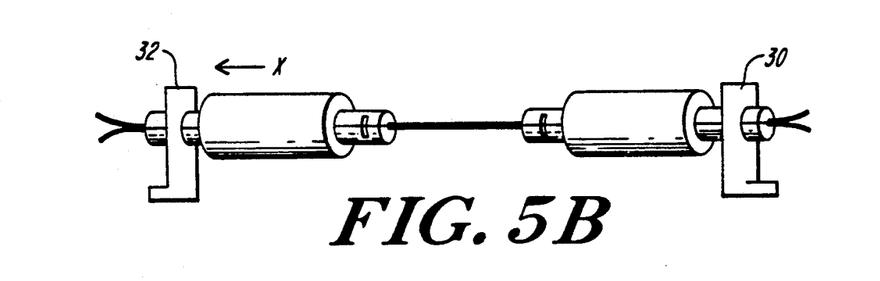
Figure 5C:
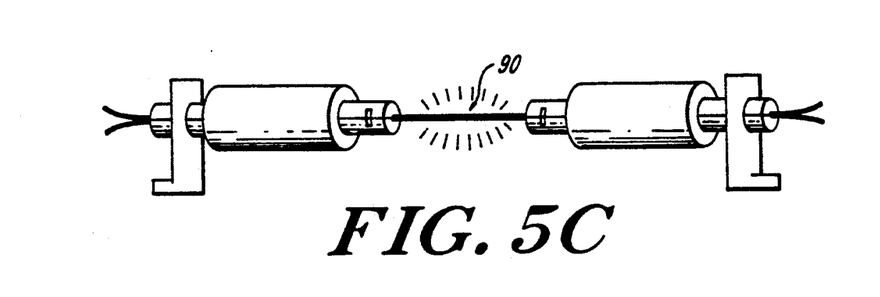
Figure 5D:
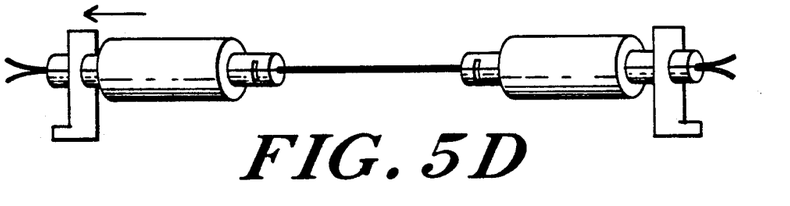
Figure 5E:
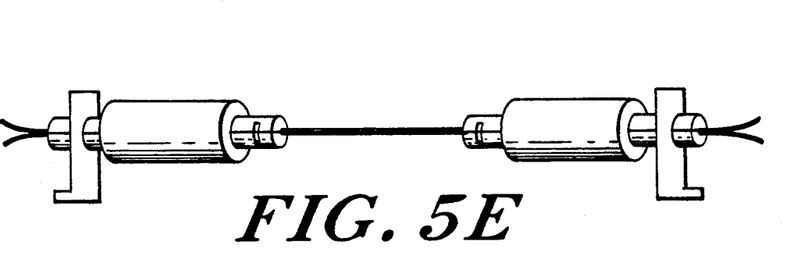

As shown in FIGS. 5a-5g, two fibers 1, 2 with their mounting rods A, B, and C, D, respectively, constitute a coupler. First, in FIG. 5a, the opposed pieces of half-rods are placed together and preferably cemented, and a tube 20 is placed about each pair to secure them in alignment. Next, in FIG. 5b, the assembled rod structures are attached to two projecting arms 30, 32 of a coupler fusion apparatus. One arm 30 is fixed and the other arm 32 is mounted on a motorized linear translation stage or a linear air bearing and coupled to a controllable pulling mechanism so that it may be moved along the direction of the arrow X of FIG. 5b to draw the fibers as they are fused. In FIG. 5c the bare portions 90 of the opposed fibers are heated and fused together, and in FIG. 5d the contacted fused fibers are tapered and elongated by a controlled amount as the coupling ratio between the fibers is actively monitored. The pulling is stopped in FIG. 5e when the desired coupling ratio has been attained. In practice, it is desirable to aim for a ratio slightly offset from the desired ratio to compensate for the slight shift in ratio that occurs as the fiber and surrounding air cool from their elevated thermal state The direction and degree of the expected shift in coupling ratio is determined in part by observation.

Figure 5F:
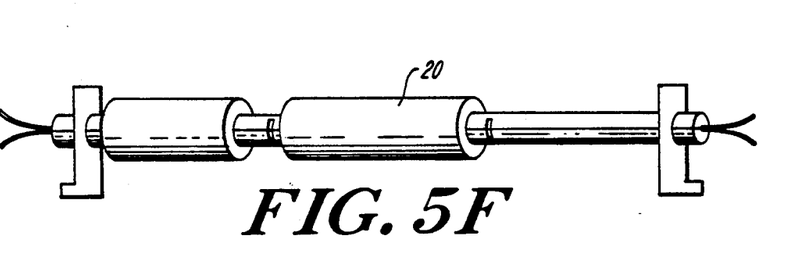
Figure 5G:
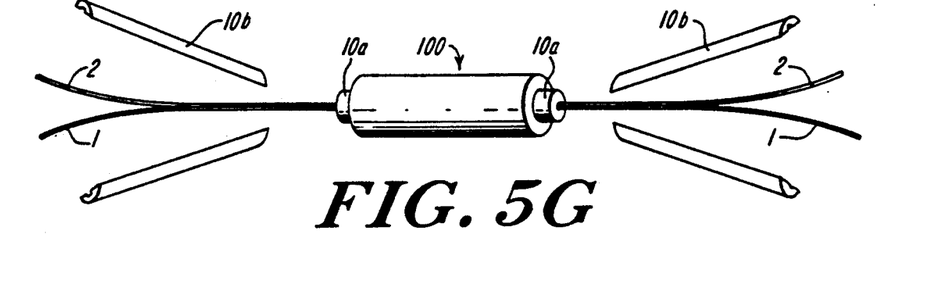

Finally, at FIG. 5f, one of the quartz or metal tubes 20 is slid over the small fiber-holding end of all four rods A, B, C, D, and is bonded In FIG. 5g the larger portions 10b of the four D-rods located behind the respective grooves 16 are scored, if necessary, and are snapped off, leaving a compact coupler body 100 comprised of a tube 20 and four of grooved D-rod segments 10a securely housing the fused splice region 90 of the coupled fibers. The other tube is not moved, and may be subsequently re-used in another coupler assembly.

A fusion coupler according to the present invention has several advantages over those of the prior art. First, the approach of gluing the bare fiber in a D-rod offers a stress-free mounting and support of the fiber for the various manipulation steps occurring during fusion and drawing. Prior art fusion couplers have generally operated by clamping each fiber in a V-groove, and that clamping pressure itself may adversely affect the birefringence of a polarizing or polarization maintaining fiber. Second, the cylindrical tube 20 automatically aligns the opposed fibers both parallel and over-center, and the D-rod flat reference surfaces 12 assure mutual fiber rotational alignment Third, the left and right rods define a fixed gap, and the rod outer and end surfaces provide large precision positioning and gripping surfaces which may be easily set up in and moved by a fusion coupler fabrication fixture mechanism. All of these features contribute to the achievement of precisely repeatable coupling parameters in completed couplers assembled in quantity.

A further feature which bears note is that the groove 14c in surface 12 allows the precise positioning, within microns, of the pair of bare fibers in the fusion region. Groove 14c may be formed such that the bare fibers are parallel to surface 12 or may be cut such that the fibers arc toward the mid-plane at a slight angle of several degrees. Also, groove 14c may be formed at a precisely selected depth to assure that the bare fiber exits the rod either at the level of surface 12, or is offset an exact number of microns from that surface. Thus, the depth and exit geometry of groove 14c allow precise control of fiber angle and the fusion contact preload or tension of the fiber pair.

Figure 6A:
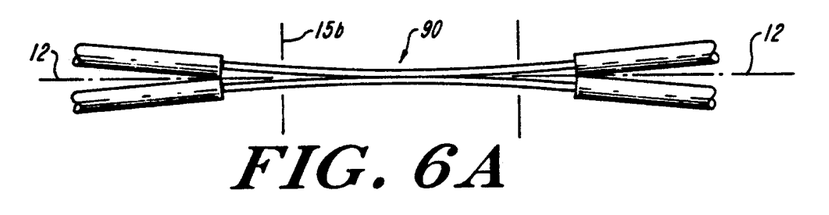
FIGS. 6a–6c show fiber preloading obtained with different rod geometries.
Figure 6B:
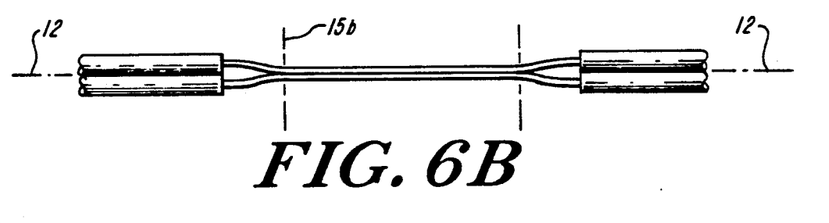
Figure 6C:
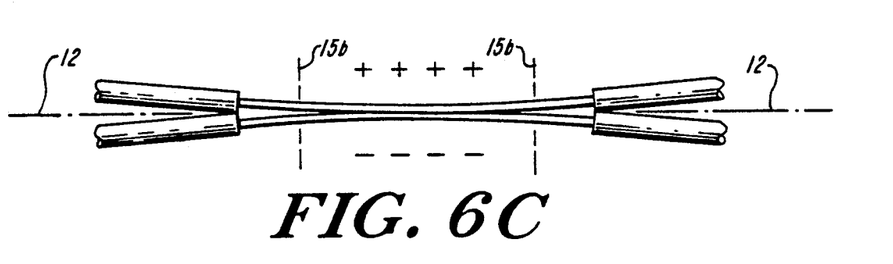

FIGS. 6a-6c show alternate contact preload techniques achieved by varying the groove depth and angle of groove 14c in the D-rods 10. The rods themselves are omitted, it being understood that the groove depth follows the position of the fiber and jacket, whereas surface 12 is, in each case, a strictly horizontal surface as viewed in the drawing. The rod end surface 15b is indicated in phantom. In FIG. 6a, the grooves follow a curved or gently angled path such that the bare fiber portions 90 arc gently up upon exiting face 15b and contact at the midplane defined by the surfaces 12.

In FIG. 6b, a situation is shown in which a flat preload is applied along a substantial portion of the bare region 90. In this embodiment, the fiber-holding grooves rise to surface 12 and exit essentially parallel to surface 12; the fibers emerge parallel and are in contact or are separated by a few microns. The fibers are optionally urged together by a set of gentle positioning fingers, or may be contacted by static charge. In FIG. 6c static charge preloading is illustrated with a groove geometry similar to that of FIG. 6a. In this case, however, rather than rely on an exit angle which is sufficiently steep to urge the fibers into contact, the exit geometry need only bring the fibers into proximity. The fibers exit face 15b slightly offset from and angled gently toward midplane 12. A charge differential is applied between the two fibers to draw them together. The use of static charge and other techniques to provide the required small level of contact force is expected to greatly reduce unwanted internal fiber strains caused by the twisting structures of coupler fusion devices of the prior art.

In different embodiments of the invention, various sub-processes may be substituted for one or more of the above described steps. For example, the alignment rods may be formed by molding, or may be formed of a material such that the axial grooves are fabricated by a photolithographic masking and etching process. Further, once the fiber is attached to a pair of the mounting rods, the fiber may be worked rather than etched to provide an enhanced coupling region.

FIGS. 7a-7d illustrate such a different set of intermediate steps in the fabrication of a coupler according to one different embodiment of the invention In this embodiment, the fibers are ground, polished or otherwise optically worked, much as they would be in a conventional lapped fiber coupler, but the polished region of the fiber remains freely supported rather than embedded in a block, and is later fused This avoids deformation and damage of the fiber birefringence region which has been a fault of other fusion couplers. This construction thus combines several of the best attributes of lapped and of fused coupler technology to produce a permanently coupled precisely aligned and free-standing coupler junction.

Figure 7A:
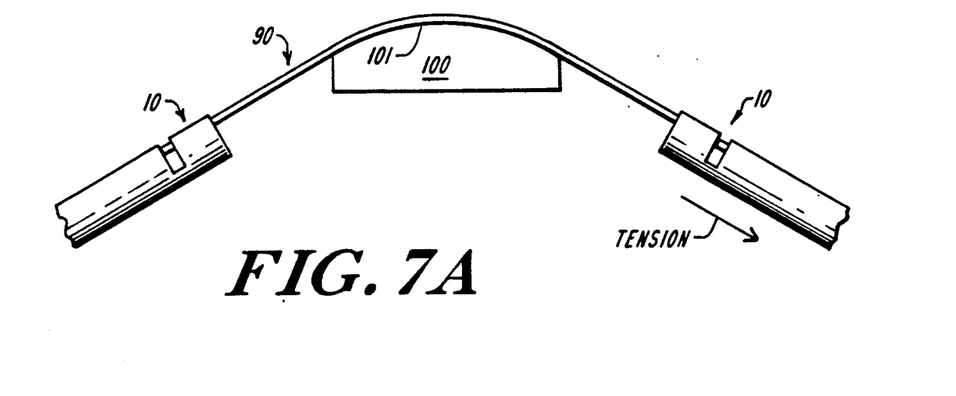
FIGS. 7a–7d show alternative embodiments of the invention.
Figure 7B:
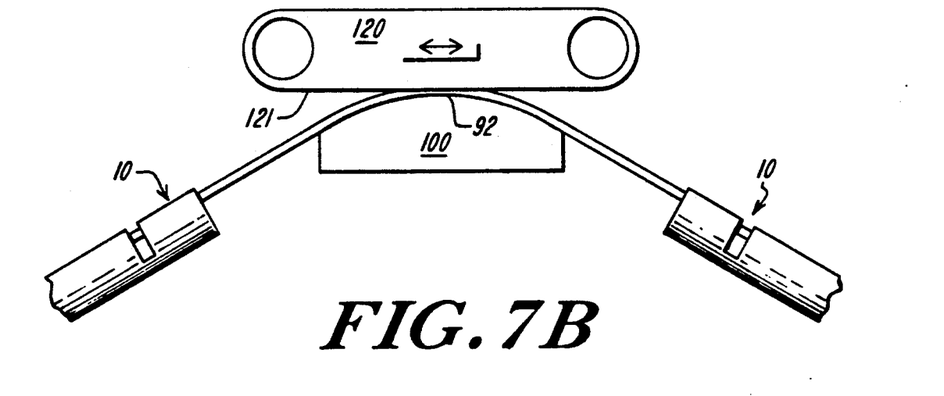

As shown in FIG. 7a, a fiber mounted in a pair of alignment rods 10 is placed in an alignment jig such that the bare fiber 90 extends over a back block 100 having a cylindrical supporting surface 101 and slight tension is applied to the portion of the jig holding one rod such that the fiber is tautly held over the supporting surface. A polishing jig 120 (FIG. 7b) having an alumina or cerium oxide lapping paper, pad or belt 121, or having a lapping compound on a flat plate, is then positioned against the fiber to polish the fiber flat near the midpoint 92 between rods 10, to a depth almost halfway through the fiber. This creates a lapped surface oriented parallel to a fiber principal axis. After polishing, the fiber has a D-shaped cross-section, with a thinned cladding layer over the core at the flat side.

Figure 7C:
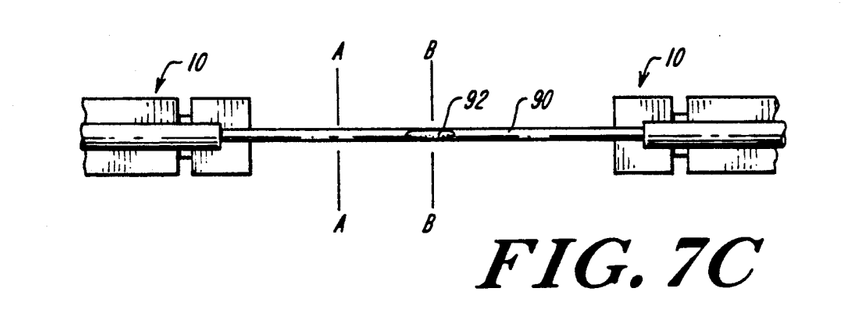
Figure 7D:
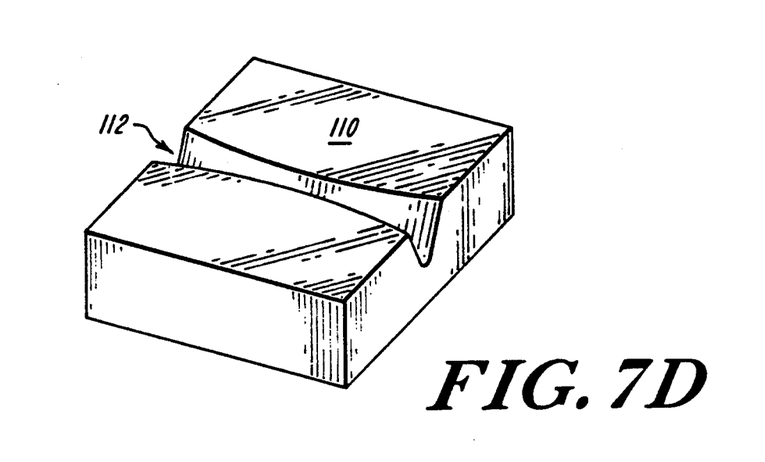

As shown in the top plan view of FIG. 7c, the worked region near midpoint 92 is an elliptical flat region. Such a worked coupling region minimized the core-to-core spacing of a completed coupler, so that etching is not necessary, and little or no drawing or tapering is required. For a fiber having an internal rod of different material constituting a stress rod for defining different core propagation axes, the use of a lapped region to form a non-tapered fusion coupling eliminates the problem of leakage from the core. The flat surface further aids in establishing alignment of the axes when contacting two fibers before fusion.

Figure 8A:
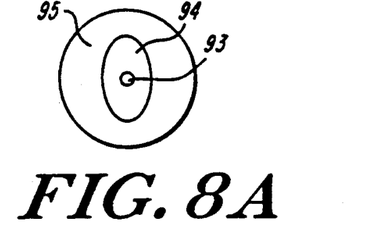
FIGS. 8a–8d compare sections of fibers prepared and coupled in accordance with the invention to those of the prior art.
Figure 8B:
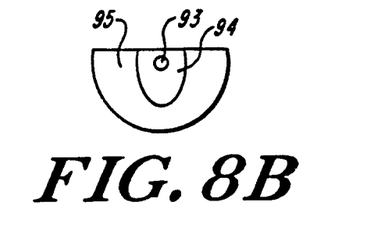
Figure 8C:
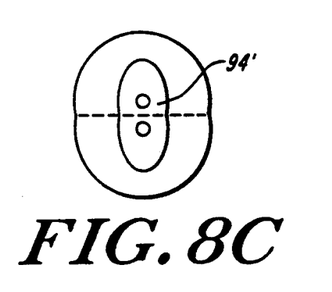
Figure 8D:
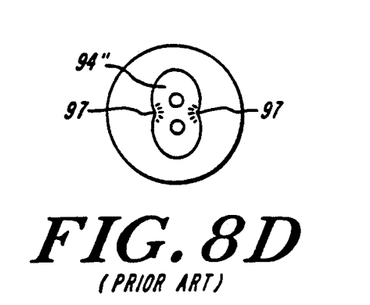

FIGS. 8a and 8b shown the fiber section at stations A—A and B—B of FIG. 7c, illustrating the internal geometry of a birefringement fiber. The core 93 resides within an elliptical stress region 94 centered in the cladding 95. In the worked region about point 92, upper portion of the elliptical stress region has been cleanly removed. FIG. 8c shows the finished coupler, having a second worked fiber fused to the first fiber. Both stress regions join without deformation to form a single region 94' which subjects each core to an environment substantially identical to that of the original region 94. Note that the final internal stress geometry is substantially the same as that of one original fiber, with the addition of a second core. Furthermore, the cladding or barrier layers remain relatively thick about each core. This offers improved light conducting properties, especially for a pure silica core radiation-hardened PM fiber or for other specialty fibers that do not readily lend themselves to fusion coupling. By contrast, FIG. 8d shows the distortion of the stress region 94" of a tapered fused coupler formed by a conventional process. At the central region 97 the stress lines have been distorted by the drawing and fusing steps, degrading the polarization channel separation. Furthermore, the symmetry is altered. Panda or Bow Tie fibers also suffer from a loss of symmetry when joined in the conventional manner.

Figure 9A:
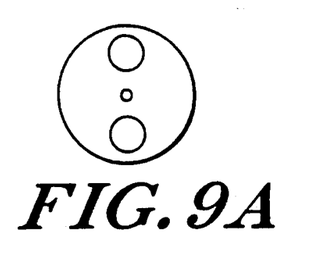
FIGS. 9a–9c show sections of another type of fiber coupled in accordance with the invention.
Figure 9B:
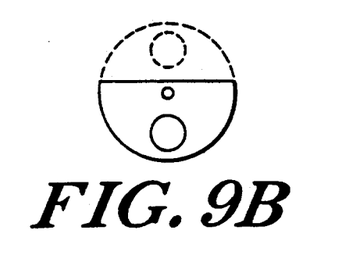
Figure 9C:
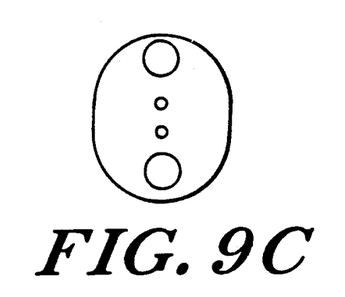

FIGS. 9a-9c are views corresponding to FIGS. 8a-8c, which illustrate a fused coupler in accordance with the present invention made from Panda fibers. Again, the essential internal geometry and symmetry are preserved.

In carrying out the foregoing method of forming an optically worked fused fiber coupler, the cylindrical backing block 100 may be replaced by a block 110 (FIG. 7d) having a fiber-retaining groove 112 formed by etching. For example, in a block of [110] Silicon, such a groove 112 may be precisely formed by exposing a lithographic resist pattern and etching a V-shaped groove in the silicon through the resist with an anisotropic etchant. A mechanically ground or cut groove block such as used in a conventional lapped coupler may also be used for this purpose.

This completes a description of the invention by reference to illustrative examples having easily made and used fiber alignment geometries. It will be understood, however, that the invention has broad applicability not just to fibers, but to variety of optical sensing, filtering or processing elements of which a fiber forms an essential part. For example, the invention is readily applied to create fused coupler resonant fiber rings, tapered polarizers, fused tapered fiber sensors, wavelength division multiplexers and similar devices.

The teachings of the invention being thus disclosed, those skilled in the art will apply those teachings to different modifications and variations, and all such modifications and variations are considered to be within the scope of the invention, as defined by the following claims

What is claimed is:

1. A block for holding a fiber for juxtaposition to and coupling with another fiber, such block comprising
adjacent first and second portions having mutually aligned grooves therein for holding the fiber, said second portion having a large groove for receiving and axially aligning a fiber jacket, and said first portion having a smaller groove aligned with the large groove for receiving and aligning a bare fiber which extends from said fiber jacket, through said smaller groove and outside the block, said block including a precision surface for aligning the bare fiber outside the block during fabrication of a fused fiber optic coupler.

2. A block according to claim 1, wherein said first and second portions are connected parts of a single block.

3. A block according to claim 2, wherein said first and second portions are frangibly connected portions of a rod.

4. A block according to claims 3, adapted to attach to a corresponding portion of a second fiber-aligning block for forming a coupling.

5. A block according to claim 4, having a mating sleeve which secures the first and second fiber-aligning blocks together in alignment.

6. A method of fusion coupling first and second optical fibers, such method comprising the steps of:
mounting the first fiber in a first rigid block having a first grooved fiber-holding portion,
mounting the second fiber in a second rigid block having a first grooved fiber-holding portion,
aligning the first and second blocks to precisely position portions of the first and second fibers in contact with each other in a region extending past the blocks along a fiber axis as they are fused and optically coupled, and
securing the first portions of each block to each other to form a coupler body for the fused and optically coupled first and second fibers.

7. The method of claim 6, further comprising the step of working a region of the first and second fibers to form a coupling surface before they are optically coupled by fusion 8. The method of claim 6, further comprising the steps of
i) providing a second portion of each block which supports the fiber held in the first portion of said block, and
ii) separating the second portion of each block from its first portion and from the fiber mounted therein.

9. The method of claim 6, wherein the step of mounting the fiber in a mounting block includes securely mounting an uncovered segment of fiber in the first portion.

10. The method of claim 9, wherein the rigid blocks each include a flat surface, and wherein the step of mounting a fiber in a mounting block includes mounting a fiber having a birefringence axis oriented in a defined angular orientation with respect to the flat surface.

11. The method of claim 10, wherein the step of mounting the fiber includes mounting the fiber in a groove which defines an exit angle and offset with respect to the flat surface of a block.

12. A block for precisely securing an optical fiber for coupling to another fiber, said block having a generally axially elongated body with an axially extending groove therein for receiving and axially aligning the optical fiber, said groove extending from a first block end portion adapted to rigidly secure a bare fiber in the groove, to a second block end portion adapted to loosely hold a jacketed fiber portion in the groove in axial alignment with the bare fiber, said block having precision surfaces by which a fiber fusion fixture controls the position an orientation of a portion of the fiber extending outside the block during coupling.

13. A block according to claim 12, wherein said second block end portion is separable from said first block end portion without damage to the fiber.

14. A block according to claim 12, which is a D-rod with a flat surface and having said groove formed in said flat surface.

15. A block according to claim 14, further comprising an optical fiber secured in said groove with a birefringence axis parallel to the flat surface.

16. A block according to claim 12, which is formed by a process of precision molding or etching.

17. A block according to claim 12, in combination with at least one further block according to claim 10, said block and at least one further block forming at least one mating opposed block pair, and a sleeve which slides over said at least one block pair to secure all blocks of the combination together as a closed coupler surrounding a region wherein fibers thereof are fused together 18. An optical fiber coupler comprising a first pair of fiber-holding blocks secured about opposed ends of a first bare fiber segment, a second pair of fiber-holding blocks secured about opposed ends of a second bare fiber segment, and a sleeve holding one of each pair of said blocks together and fixedly spaced apart from the other one of each pair of said blocks at each end of the fiber segment, the first and second bare fiber segments being fused together in a central region enclosed by said sleeve and said blocks.

19. An optical fiber coupler according to claim 18, further comprising an optically worked surface on each fiber parallel to a fiber birefringence axis, the first and second bare fiber segments being fused together along their respective worked surfaces.

20. A block having first and second connected and aligned portions shaped for securely holding a fiber, and for supporting a fiber in alignment, respectively, and including a fiber secured to said first portion, said block having a precision surface positioned for aligning the fiber to form a fused coupling at a junction region of the fiber with another fiber, wherein said portion of the block is closer to the junction region than is the second portion of the block, said first and second portions being separable.

21. A block according to claim 20, wherein said first and second portions are connected by a breakable spine, and are separable by breaking the spine.

* * * * *

UNITED STATES PATENT AND TRADEMARK OFFICE
CERTIFICATE OF CORRECTION

PATENT NO. : 5,078,465
DATED : January 7, 1992
INVENTOR(S) : Dahlgren

It is certified that error appears in the above-indentified patent and that said Letters Patent is hereby corrected as shown below:

```
Please amend the patent as follows.

Column 1, line 6, after "fibers" insert --.--.

Column 2, line 3, delete "Plastic" and insert
--plastic--.

Column 4, line 4, after "12" insert --.--.

Column 4, line 18, after "fusing" insert --.--.

Column 4, line 28, after "14c" insert --,--.

Column 5, line 10, after "state" insert --.--.
```

UNITED STATES PATENT AND TRADEMARK OFFICE
CERTIFICATE OF CORRECTION

PATENT NO. : 5,078,465
DATED : January 7, 1992
INVENTOR(S) : Dahlgren

It is certified that error appears in the above-indentified patent and that said Letters Patent is hereby corrected as shown below:

Column 5, line 14, after "bonded" insert --.--.

Column 5, line 34, after "alignment" insert --.--.

Column 6, line 30, after "invention" insert --.--.

Column 6, line 35, after "fused" insert --.--.

Claim 7, column 8, line 33, after "fusion" insert --.--.

Signed and Sealed this

Twenty-fourth Day of August, 1993

Attest:

BRUCE LEHMAN

Attesting Officer     Commissioner of Patents and Trademarks